United States Patent

[11] 3,593,162

[72] Inventor James R. Patmore
Neptune, N.J.
[21] Appl. No. 810,195
[22] Filed Mar. 25, 1969
[45] Patented July 13, 1971
[73] Assignee Electronic Associates Inc.
Long Branch, N.J.

[54] ANALOG COMPARATOR
2 Claims, 3 Drawing Figs.

[52] U.S. Cl. .......... 328/111,
328/37, 328/94, 328/147, 328/158, 328/165
[51] Int. Cl. .......... H03k 5/20
[50] Field of Search .......... 328/111,
146, 147, 149, 37, 94, 158, 165; 307/234

[56] References Cited
UNITED STATES PATENTS

| | | | |
|---|---|---|---|
| 3,395,353 | 7/1968 | King | 328/111 X |
| 3,513,400 | 5/1970 | Russell | 328/147 |

OTHER REFERENCES

ELECTRONIC ANALOG AND HYBRID COMPUTERS by Korn & Korn 1964 McGraw-Hill Bk. Co., Page 220

*Primary Examiner*—John S. Heyman
*Attorneys*—Edward A. Petko and Robert M. Skolnik

ABSTRACT: A circuit arrangement for eliminating noise-generated ambiguous outputs of an analog comparator is disclosed providing a number of flip-flops operating in the shift register mode resulting in a pulse width discrimination of the comparator output directly proportional to the number of flip-flops.

FIGURE I

INVENTOR.
JAMES R. PATMORE

ANALOG COMPARATOR

This invention relates to amplitude comparators and, more particularly, to a circuit for providing an improved accuracy output from such comparators in the presence of noise at the input.

The comparators referred to in the present invention are described in section 6—8 of *Electronic Analog and Hybrid Computers* by Korn and Korn, published in 1964 by the McGraw-Hill Book Company. These comparators produce an output which changes decisively between two definite levels whenever the sum of the comparator input voltages changes sign. This operation constitutes an elementary analog-to-digital conversion. The inputs to the comparator are a continually variable analog voltage, and a fixed voltage representing a binary decision derived from timing circuits, other analog comparators, or appropriate digital computer logic.

A number of problems are associated with such comparators, some of which are set forth in the aforementioned section 6—8. One of the more important of these problems is that of spurious changes in the comparator output caused by random noise in the analog input signal. It will be appreciated that it is desirable to produce a change in state whenever the magnitude of the analog input signal passes the value of the fixed level binary decision voltage. For a slowly increasing or decreasing amplitude analog signals, random noise superimposed thereon causes momentary increases or decreases in analog amplitude. These increases or decreases may be sufficient to produce a fluctuation in relative magnitudes of the analog signal and the fixed level signal sufficient to cause a number of changes in comparator output state. These output state changes occur at a random rate and are detrimental to overall performance of the computer in which the comparators are employed.

Prior practice has attempted to minimize these spurious comparator output state changes in either of two ways. The comparator circuit itself has been modified by the addition of hysteresis thereto. That is, once the output of the comparator changes state, the analog signal must decrease or increase a predetermined amount before the comparator again changes state. This approach attempts to mask the effect noise by providing limits of amplitude change outside the expected noise level.

The problem with this approach is twofold: first, an amplitude error must be designed into the comparator; and second, the amplitudes of the expected random noise are occasionally greater than the design limits.

Hysteresis is added by the provision of positive feedback to mask the noise. The comparator is, essentially, an output-limited, high-gain, amplifier. When the output changes state, part of the output is fed back and summed with the analog signal. This feedback increases the magnitude of the analog input signal by a predetermined amount to mask a portion of random noise amplitude.

The second approach involves the lowering of the frequency response of the comparator. As the random noise is generally of high frequency, the noise cannot cause the comparator to change state. However, the analog signal itself is often of a frequency as high or higher than the random noise resulting in a filtering of input signal as well. This elimination of input signal results in a failure of the comparator to change state for high frequency inputs.

This approach is also dependent on the amplitude of the noise pulse because the filter operates by integrating the area of the input pulse. Pulses of less than a predetermined duration but of large amplitude thus have an area sufficient to cause the comparator to respond.

The present invention provides complete elimination of spurious comparator outputs caused by noise pulses of any amplitude. This is accomplished by width discrimination of the comparator output pulse.

More particularly, the output of the analog comparator is connected to the first of a series of "JK" flip-flops operating in the shift register mode. A "JK" flip-flop produces no ambiguous output states from simultaneous inputs in either the one or the zero state. One and zero state inputs on both the set (S) and clear (C) inputs of the flip-flop, causes the output to reverse or toggle on each clock pulse. These devices are described at pages 128—129, *Logical Design of Digital Computers* by Montgomery Phister, Jr., published by John Wiley & Sons, Inc., in 1958. The number of "JK" flip-flops used is directly proportional to the pulse width required to eliminate the effects of spurious comparator outputs.

The outputs of the first and last "JK" flip-flop are connected to a logical AND gate whose output is indicative of the comparator output pulse width.

An object of the present invention is the elimination of the effects of noise from the output of an analog comparator.

Another object of the invention is the provision of a pulse width discrimination circuit for blocking noise-generated outputs of an analog comparator while retaining the necessary input amplitude and frequency sensitivity of the comparator.

These as well as further objects and advantages of the invention will become apparent from the following specification reference being made to the accompanying drawings in which.

Figure 1:
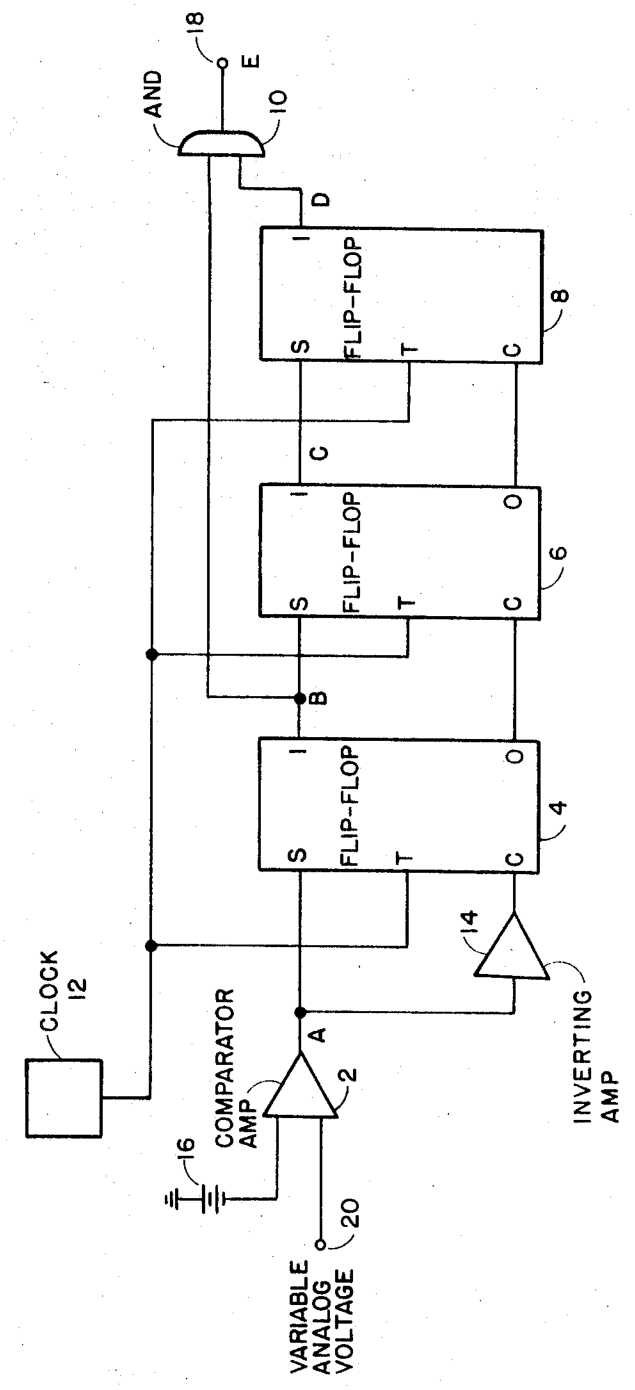
FIG. 1 is a block diagram of the preferred embodiment.

In FIG. 1, an analog comparator amplifier 2 of the type discussed in the above-noted section of Korn and Korn has its inputs connected to: a fixed voltage level represented by battery 16, and to an input terminal 20 connected to a source of variable analog voltage, not shown. As stated previously, the output of comparator 2 changes decisively wherever the sum of the input voltages thereto changes sign. For the purpose of the following explanation, it is assumed that the variable voltage at terminal 20 has just increased beyond the value of source 16 causing a logical one output from the comparator. This output appears directly as a one at the set (S) input of a "JK" flip-flop 4 and as a zero at the clear (C) input of the same flip-flop. The zero results by insertion of inverting amplifier 14 between the output of comparator 20 and the aforementioned clear input. From the truth table for the "JK" flip-flop, the appearance of a one and a zero as inputs thereto will produce a one output upon the occurrence of a clock pulse at the trigger (T) input. To provide the trigger input, a system clock source 12 is connected to each trigger input of all the "JK" flip-flops.

On the occurrence of a clock pulse, a one output is produced on the one side of flip-flop 4 and a zero output is developed on the zero side of flip-flop 4. These outputs appear as input to another "JK" flip-flop 6. The operation of flip-flop 6 is the same as that of flip-flop 4 so that, upon the occurrence of a clock pulse at the trigger (T) input of flip-flop 6, a one and a zero output appear as inputs to a further "JK" flip-flop 8. On the occurrence of a further clock pulse, flip-flop 8 produces a one output for application to an AND gate 10. The other input of AND gate 10 is connected to the one output of the first "JK" flip-flop 4. Thus, an output appears on terminal 18, if both of the flip-flops 4 and 8 have a one output on their one output sides.

Figure 2:
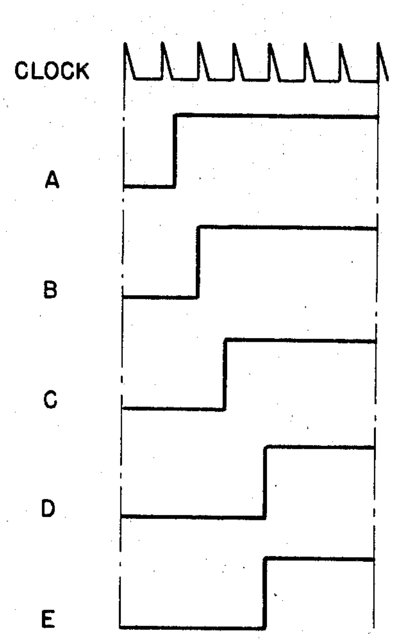
FIGS. 2 and 3 are diagrams of signal levels in the block diagram of FIG. 1.

Turning now to FIG. 2 in which the letter designations refer to the corresponding designations in FIG. 1, the situation is presented where the analog input signal at terminal 20 increases above the fixed voltage level and maintains that increase for a length of time greater than three clock periods.

More particularly, the output A of comparator 20 occurs at any time relative to the output of clock source 12, and maintains its level for a period of time greater than three clock pulses. Output A appears as one and zero inputs to flip-flop 4, and, upon the occurrence of the next clock pulse, a one output, B, is produced by that flip-flop. Output B appears as an input to the next flip-flop 6 which, upon the occurrence of the next clock pulse, produces signal level C. In a similar manner, flip-flop 8 produces level D for application to AND gate 10.

The simultaneous application of level D and level B to AND gate 10 produces a one output E at terminal 18. This indicates that comparator output A was of a width greater than three clock pulses.

Figure 3:
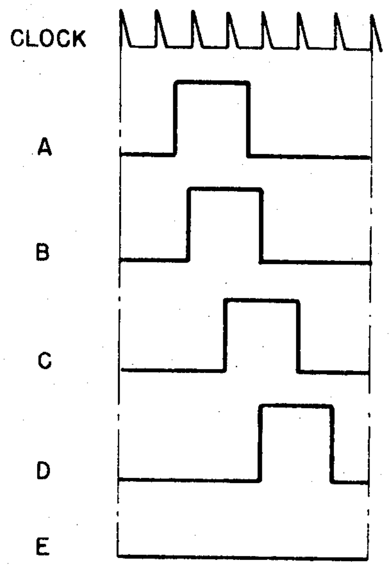

FIG. 3 illustrates the situation where comparator output A has a width less than three clock pulses. Again, output A may occur at any time relative to the output of clock source 12, but in this example, pulse A occurs for less than three clock periods. As shown in FIG. 3, the output B, of flip-flop 4 commences on the occurrence of the first clock pulse after input A becomes a logical one. Flip-flop 4 will reset on the next clock pulse after input A becomes a zero. Thus, signal B in FIG. 3 has a width of three clock periods. Output C of flip-flop 6 occurs upon the application of signal B and a clock pulse and terminates on the next clock pulse after termination of signal B. Output D is generated in a like manner for application to AND gate 10. The other input to gate 10 is the output B of flip-flop 4, which results in a zero output E at terminal 18.

Thus, it can readily be seen that the number of "JK" flip-flops 4, 6, 8, etc., is determinative of the allowable pulse width output of comparator 20. Three flip-flops will prevent comparator outputs of a duration of three or less than three clock pulses from being utilized. Two flip-flops prevent use of comparator outputs of a duration of two or less than two clock pulses. The number of flip-flops utilized is dependent upon the expected duration of the noise at the input to the comparator.

The present invention provides elimination of spurious comparator outputs by, in effect, delaying the output of the comparator in direct proportion to the number of flip-flops employed. This delay provides no disadvantages over the prior approaches since the prior procedures required a period of time for synchronization of the comparator output with the system clock. The present invention thus provides both synchronization and complete discrimination of spurious comparator outputs based on noise amplitude. In addition, effective discrimination of spurious output pulses based on noise duration or frequency is accomplished by precise design and accurate considerations of the expected noise in the analog input signal.

I claim:

1. A circuit for eliminating the effects of noise-generated outputs from a comparison means comprising:
   - comparison means for producing an output pulse whenever the sum of the input signals thereto changes sign, and
   - pulse width discrimination means including a plurality of flip-flops connected to said comparison means having at least a first and a last flip-flop; a logical AND gate having inputs connected to the outputs of said first and last flip-flops, and a source of clock pulses connected to each of said flip-flops for producing an output indication if said output pulse duration is greater than a duration dependent upon the number of said flip-flops.

2. A circuit for eliminating noise-generated outputs of a comparison means comprising:
   - comparison means for producing an output indication whenever the sum of the input signals thereto changes sign,
   - a plurality of "JK" flip-flops operating in the shift register mode including a first and a last flip-flop, each of said flip-flops having set, trigger and clear input terminals and ONE and ZERO output terminals, for propagating ONE and ZERO output signals from said first to said last flip-flop,
   - means connected to said comparison means and to said first set input terminal for applying said output indication to said first set terminal,
   - inversion means having an input connected to said comparison means and an output connected to said first clear terminal,
   - a source of clock pulses connected to each of said trigger input terminals so that occurrence of an output indication and a clock pulse produce ONE and ZERO output at said first flip-flop, and
   - a logical AND gate having inputs connected to said first and last ONE output terminals for producing an output when said inputs thereto are in a ONE state.